UNITED STATES PATENT OFFICE.

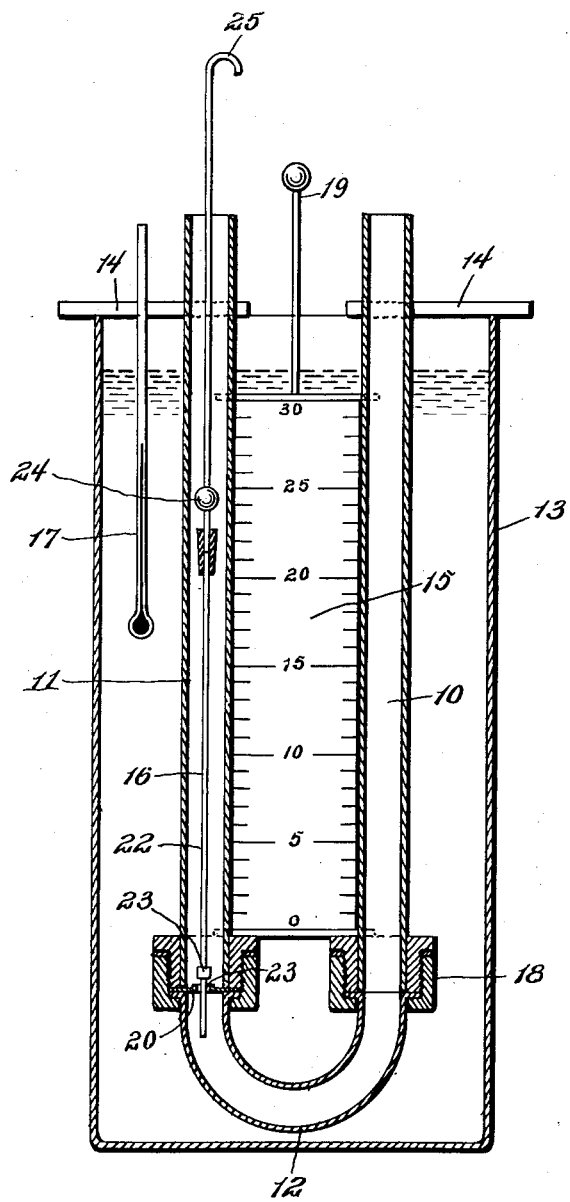

HOWARD N. MOODY, OF NEW ORLEANS, LOUISIANA.

VISCOSIMETER.

1,405,538.  Specification of Letters Patent.  Patented Feb. 7, 1922.

Application filed January 5, 1920. Serial No. 349,419.

*To all whom it may concern:*

Be it known that I, HOWARD N. MOODY, a citizen of the United States, residing at New Orleans, in the Parish of Orleans and State of Louisiana, have invented new and useful Improvements in Viscosimeters, of which the following is a specification.

The object of the invention is to provide a simple and relatively inexpensive means for determining with accuracy the coefficient of viscosity of a liquid in connection with engineering and analogous problems involving the installation of piping, conduits and similar conductors for conveying liquids under the influence of gravity and wherein the grade or inclination at which the conductor must be disposed constitutes a factor of the problem, and wherein the temperature of the liquid in the course of its conveyance must be taken into consideration, and to this end the invention consists in a construction, combination and relation of parts hereinafter described in connection with a form of the device which is adapted for laboratory use, it being understood however that changes in form, proportion and details may be resorted to within the scope of the appended claims without departing from the principles involved.

The drawing illustrates in vertical section a simple and convenient form of the apparatus as seen prior to the introduction of the liquid to be tested.

Essentially the device consists of a U-shaped tube having a feed member or down leg 10 and a receiving member or up leg 11 connected by the goose-neck 12, a tempering device consisting of a glass beaker 13 in which the U-shaped tube is supported, as for example by means of clamps 14, a scale 15 is disposed for movement relative to the legs of the tube, a cut off 16 for controlling the flow of liquid from the feed member to the receiving member of the tube, and a temperature indicator such as a thermometer 17. These parts may be arranged in any convenient relation but as shown the tube is supported within the glass beaker which may be filled with water or other liquid shown at any desired temperature which would be indicated by the thermometer, said tube being held out of contact throughout its length with the walls of the glass beaker and having its goose-neck 12 detachably connected with the lower extremities of the feed and receiving tube members by means of screw caps 18 or the equivalent thereof, so that whereas brass or other equivalent material may, under ordinary circumstances be employed in the construction of the means for connecting the lower ends of the tube members, glass or other non-corrosive material may be employed when the liquid to be tested is of an acid nature. In this case the tube is to be continuous U-tube with fixed head. The legs of the U-shaped tube are employed as a guide for the scale which is provided with an operating stem 19 so that after a desired amount of the liquid has been deposited in the tube the scale may be adjusted to arrange its zero point at the level of the contents of both members, the same being held at the desired adjustment by friction or any equivalent means forming a new part of the structure herein disclosed. Then the valve is seated and a certain quantity of the liquid to be tested is introduced into leg No. 11, the quantity to be determined by an adjustable scale 15 which is calibrated in centimeters. In jerking quickly the valve off seat one half of the amount measured passes into tube 10. Thermometers are also introduced in both tubes 10 and 11, if desired.

Communication between the legs of the tube is afforded by means of a graduated opening 20 of small diameter so that when the feed or receiving member of the tube has been filled to a level above that of said opening, and the latter is exposed, there will be a relatively slow passage of the liquid into the receiving member, so that an appreciable amount of time will be required to permit the level of the liquid in the latter to correspond with that in the former. This communicating opening or passage, which is preferably short, or is formed in a thin plate or its equivalent, is indicated at 20, so as to minimize the resistance due to frictional contact of the liquid with the walls thereof in the course of passage from the feed to the receiving member of the tube, and during the charging of the former this graduated passage or orifice is closed by means of a valve 22 having a button 23 adapted to be seated upon the plate, and the stem of said valve extending longitudinally through the receiving member of the tube and being provided with a weight 24 and a handle or grip 25 which is accessible to the operator.

In operation, the communicating orifice between the members of the tube being closed by means of the valve, a quantity of the liquid to be tested is introduced into the feed member until it reaches a level, for example, slightly above that indicated by the zero graduation of the scale as positioned in the drawing, whereupon said scale is moved until said zero graduation corresponds with the level of the liquid in the tube and a further quantity of the liquid to be tested is then introduced until it reaches any selected level on the scale.

Then using a suitable timing device, such as a stop watch or the equivalent thereof, the feed orifice is opened by the unseating or withdrawal of the valve to permit the liquid in the tube to pass under the influence of gravity into the receiving member and the time required to permit a sufficient quantity of the liquid to be thus transferred until a common level of the liquid is reached in both members of the tube is noted. The capacity of the communicating orifice being standard with reference to viscosity tables known in this art, with the further ascertained factors of the temperature of the liquid and the length of time required for the transfer, will permit of an accurate calculation and determination of the relative viscosity of the liquid tested or the coefficient of viscosity thereof as compared with the assumed unit or standard described by the table. Obviously successive tests at different temperatures may be conducted by varying the degree of heat in the tempering chamber, to the end that the action which may be expected of the liquid when in movement under the influence of gravity at given angles of inclination of a conveyer may be ascertained as a guide in the arrangement of such means as are employed in factories and similar establishments for conducting liquids having different physical characteristics from one point to another.

Having thus fully described my invention, I claim:—

1. A viscosimeter comprising parallel upright tubes, one constituting a feed tube for the flow of liquid by gravity therefrom to the other tube, a cross connection establishing communication between the lower ends of said tubes, a stationary diaphragm arranged in the line of flow of the liquid passing from one tube to the other, said diaphragm having a predetermined orifice formed therein, and a valve independent of said diaphragm disposed within one of said tubes for closing said orifice.

2. A viscosimeter comprising a pair of parallel upright tubes, one constituting a feed tube for the flow of liquid by gravity therefrom to the other, said tubes having a cross connection at their lower ends, the flow of liquid from the first-named tube to the second-named tube through said cross connection being controlled by a predetermined orifice of less diameter than the diameter of the tubes, a stem movable longitudinally within one of the tubes, and a valve carried by said stem for closing said orifice.

3. A viscosimeter comprising parallel upright tubes, a flow passage between the lower ends of said tubes, a barrier in said passage, the flow of liquid from one tube to the other through said passage being controlled by a predetermined orifice of invariable diameter formed in said barrier, a valve for governing said orifice, said valve being movably mounted on the discharge side of the barrier, and a volumetric scale mounted for movement relative to one of said tubes.

4. A viscosimeter having tube members communicating through a cross connection of their lower ends and of which one is disposed to feed a contained liquid by gravity, and wherein entrance therefrom to the other through said cross connection is controlled by a predetermined orifice, means for temporarily closing the orifice during the charging of the first named member, and a volumetric scale movable relative to the first named member.

5. A viscosimeter having a U-shaped tube disposed in a tempering tank and having a predetermined orifice forming the means of communication between the feed and receiving members or legs of the tube, an orifice controlling valve having its stem accessible from the exterior of the tube, and a volumetric scale mounted for movement relative to the members of the tube for location with its zero graduation in relation to an arbitrarily determined level of the contents of the feed member.

6. A viscosimeter comprising parallel upright tubes, a flow connection between the lower ends of said tubes, the passage of liquid from one tube to the other through said connection being controlled by a restricted orifice, a valve for governing said orifice, and a volumetric scale arranged between and in guided engagement with said tubes for movement relative to one of said tubes.

In testimony whereof I affix my signature.

HOWARD N. MOODY.